UNITED STATES PATENT OFFICE.

ALBERT BRANN, OF EAST ORANGE, NEW JERSEY, ASSIGNOR TO WESTINGHOUSE LAMP COMPANY, A CORPORATION OF PENNSYLVANIA.

WIRE-DRAWING LUBRICANT.

1,409,658. Specification of Letters Patent. Patented Mar. 14, 1922.

No Drawing. Application filed January 3, 1919. Serial No. 269,532.

*To all whom it may concern:*

Be it known that I, ALBERT BRANN, a citizen of the United States, and a resident of East Orange, in the county of Essex and State of New Jersey, have invented a new and useful Improvement in Wire-Drawing Lubricants, of which the following is a specification.

My invention relates to the art of wire drawing and particularly to a lubricant and to a method of preparing the same whereby the drawing operations may be facilitated and the die wear be reduced.

One of the objects of the present invention is the provision of a homogeneous lubricant that shall have a gelatinous consistency and be especially adaptable to hot-wire drawing.

Another object of my invention is the provision of a method of holding an amorphous body in suspension through the medium of a gelatinizing substance of the gelatine type.

At the present time, in the hot drawing of tungsten wire, it is usual to employ a lubricant composed of deflocculated graphite suitably held in suspension, which is known to the trade as aqua-dag. This substance is baked or burned upon the wire by first passing the wire through a quantity of aqua-dag and then heating the former to a temperature which may vary from below incipient redness to a bright red heat or higher. Applying graphite in this manner causes it to adhere to the wire in the form of a dehydrated graphitic lubricating coating. The coating of graphite covering the wire, as a result of this baking operation, is more or less permanent and functions as a lubricant for facilitating the drawing of the tungsten and greatly lessens the wear on the dies used in the drawing operations.

Although satisfactory results are obtained by the use of aqua-dag as a lubricating agent in hot drawing, it is a commodity which is quite expensive and only procurable from limited sources. I have found that an equally efficient, if not superior, lubricant may be obtained at a considerably less expense by practicing my invention.

My invention contemplates the elimination of a defloculating agent for effecting the suspension of an amorphous substance, such as graphite, by providing a semi-fluid or gelatinous vehicle capable of sustaining small particles of the graphite.

It has been contended by the manufacturers of aqua-dag that its success as a lubricant is largely dependent upon the deflocculation of the graphite to approximately the molecular stage, which makes possible its suspension in water. However, I find this to be unnecessary if a suitable liquid or semi-liquid conveyer is provided, and, in fact, prefer that the particles of graphite be large relative to their molecular condition. Within certain bounds, the larger the particles of graphite, the more satisfactory the results seem to be in drawing hot wire, such as tungsten. This is perhaps due to the fact that, although the graphite is held in suspension in a rather finely divided state, the particles thereof are large enough to constitute flakes which, when baked upon the wire, as above described, apparently overlap one another, completely covering the exterior of the wire and preventing the formation of interstices which frequently exist, (to the detriment of obtaining best results), when the graphite is applied in a deflocculated or very fine state of subdivision.

A further advantage of suspending the particles of graphite in a gelatinous medium results from the fact that this method of suspension prevents the precipitation or settling out of the graphite particles which usually occurs in the case of aqua-dag, thus frequently causing a non-uniform lubricating coating being applied to the wire.

In accordance with my invention, I provide a gelatinous substance for carrying, in suspension, fine particles of an amorphous body, such as graphite. This substance may be made by taking a gelatinous mass obtained by boiling agar-agar, gelatine, algin or like gelatinizing material with sufficient water to give a jelly-like consistency. This gelatinous mass is then thoroughly mixed with powdered graphite until the whole becomes homogeneous throughout. Finely-divided graphite, thus mixed with a properly prepared gelatinizing substance, is held mechanically in suspension.

The lubricant thus obtained may be applied to tungsten wire in a manner similar to that described above, and experience has taught that when so applied highly satisfactory results are obtained in the drawing operations.

While this invention has been set forth in certain preferred embodiments, it will be understood that modifications may be made without departure from the spirit and scope thereof.

What I claim as my invention is:

1. A homogeneous lubricant consisting of powdered graphite mechanically held in suspension by a gelatinous medium obtained by boiling agar-agar with sufficient liquid to produce a jelly-like consistency.

2. A homogeneous lubricant consisting of powdered graphite mechanically held in suspension by a gelatinous medium obtained by boiling agar-agar, or equivalent gelatinous-substance, with sufficient liquid to produce a jelly-like consistency.

3. The method of mechanically suspending powdered graphite which consists in mixing the powder with a gelatinous medium obtained by boiling agar-agar with sufficient water to give a jelly-like consistency.

4. The method of mechanically suspending powdered graphite which consists in mixing the powder with a gelatinous medium obtained by boiling agar-agar, or equivalent gelatinous substance, with sufficient water to give a jelly-like consistency.

In testimony whereof, I have hereunto subscribed my name this twenty-third day of December 1918.

ALBERT BRANN.